United States Patent [19]

Gall

[11] 4,019,264
[45] Apr. 26, 1977

[54] PHOTOGRAPHIC TEACHING APPARATUS UTILIZING A THREE-COORDINATE REFERENCE SYSTEM

[76] Inventor: Henry Matthew Gall, 144-22 22nd Road, Whitestone, N.Y. 11357

[22] Filed: Apr. 23, 1975

[21] Appl. No.: 570,613

[52] U.S. Cl. .................................... 35/53; 33/1 G; 35/16

[51] Int. Cl.$^2$ ........................................ G09B 25/00

[58] Field of Search ....... 33/1 G, 1 N, 1 AA, 1 DD, 33/228; 35/7 R, 7 A, 8 R, 16, 24 R, 28, 29 C, 51, 54; 354/290, 292

[56] References Cited

UNITED STATES PATENTS

| | | | |
|---|---|---|---|
| 2,105,592 | 1/1938 | Hathaway | 35/10 |
| 2,225,903 | 12/1940 | Chaix | 33/1 AA |
| 2,495,975 | 1/1950 | Kelly | 35/51 X |
| 3,002,278 | 10/1961 | Weems | 33/228 X |
| 3,209,462 | 10/1965 | Harford | 35/8 R X |
| 3,720,009 | 3/1973 | Hutar | 35/24 R |
| 3,824,692 | 7/1974 | Guffey | 33/1 AA |
| 3,851,394 | 12/1974 | Ihms | 35/16 X |

Primary Examiner—Harland S. Skogquist

Attorney, Agent, or Firm—Neuman, Williams, Anderson & Olson

[57] ABSTRACT

Apparatus for illustrating the structural and distance relationship between the subject to be photographed in a studio and the photographic equipment used. The apparatus includes a horizontal board representing the floor of the studio. A predetermined pattern of holes or apertures are located in the board beginning with a center hole and continuing with a plurality of holes forming concentric circles therearound. The distance from the center hole to each concentric circle of holes is scaled. Models representing the subject and the photographic equipment comprise a head portion to identify the model and a graduated support piece. The graduations on each support piece correspond to the scaled distances from the center hole to each of the concentric circles of holes. The models are placed at different distances and angular positions from the center hole and inserted in the concentric circle holes so that the portion remaining above the horizontal board is representative of the height of the equipment.

1 Claim, 6 Drawing Figures

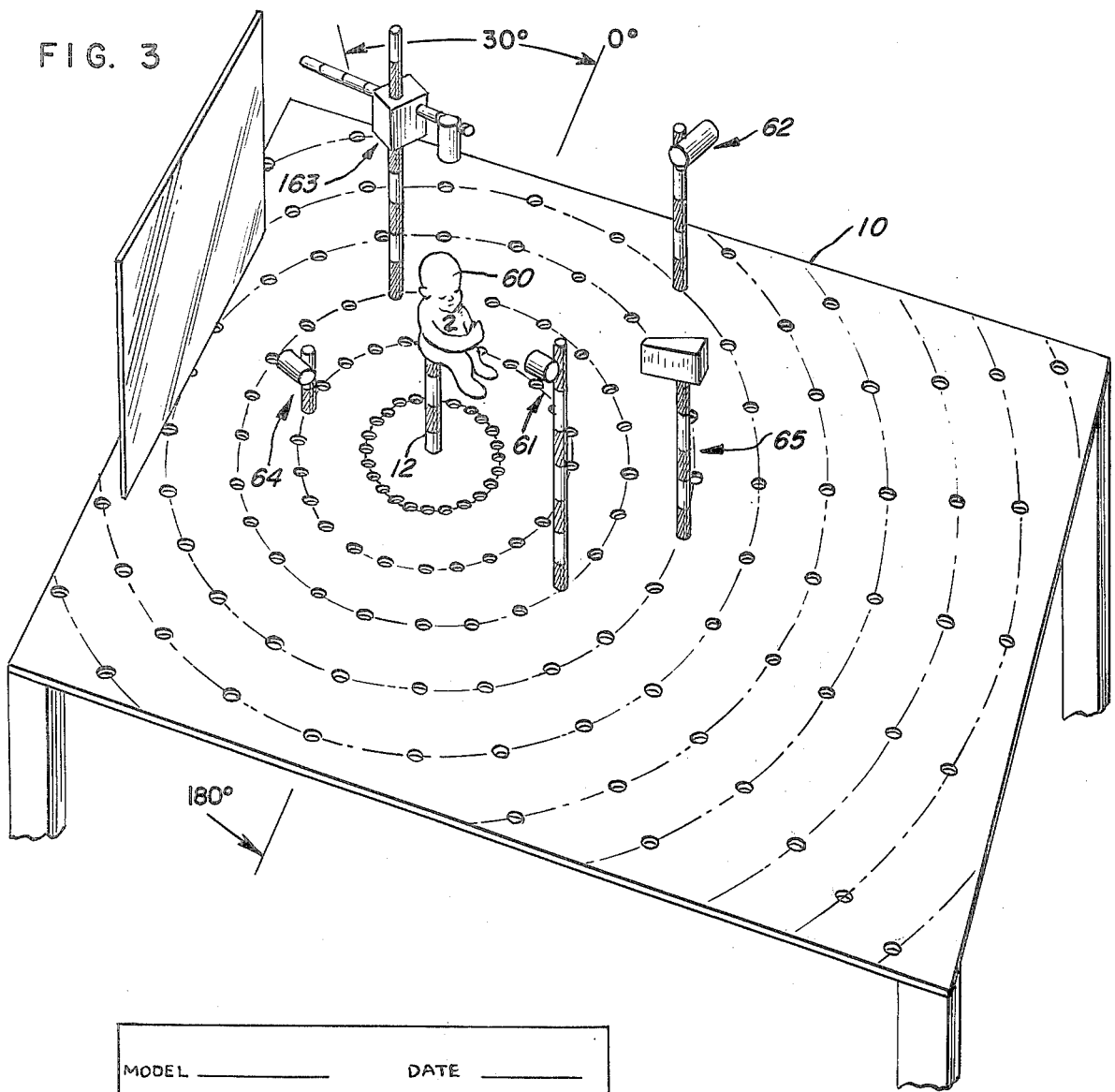

PHOTOGRAPHIC TEACHING APPARATUS UTILIZING A THREE-COORDINATE REFERENCE SYSTEM

BACKGROUND OF THE INVENTION

The field of the invention relates to photography and particularly to the instruction thereof concerning the relationships between equipment and between the equipment and subject. Prior methods of instruction include the textbook method in which reading materials explain the reasons or purpose of a particular piece of equipment and the effect that the piece of equipment would produce when placed at a certain distance and angle from the subject and at a certain height. This information while important to a proper understandng of the photographic art fails to provide the student with an appreciation of the practical and physical arrangement of the equipment.

Another prior art method of instruction is actual studio teaching. In this method, the physical equipment must be moved to different positions to simulate a real photographic situation. The movement of the equipment from one arrangement to another requires the use of the studio itself thereby making it unusable for business purposes at the time of teaching. In addition, the time consumed by the physical arrangement and rearrangement of the equipment is lengthy and wasteful for both the instructor and student since many idle minutes are spent while the equipment is disassembled, moved and reassembled. Further, there is a risk that the expensive and delicate equipment will be inadvertently damaged during the course of the many different layouts which are arranged to teach the student. Also, in both of these prior methods, there is no simple medium of reference supplied for the student to accurately record the many different positions (distance, angle and height) of the equipment. Therefore, only through continuous repeating and memorizing can a particular layout be mastered and remembered.

There are many prior art devices which provide a miniature visual picture and simulate the functioning of a fullsize object. The scale models of cars, planes, trains, boats and other vehicles are ready examples. There are scale models of entire manufacturing plants as described in U.S. Pat. No. 2,958,142 issued on Nov. 1, 1960 to H. Kershaw, et al. The concept of scale models in the field of decorating is disclosed in U.S. Pat. No. 3,269,034 issued on Aug. 30, 1966 to M. Glass, et al. And, U.S. Pat. No. 2,105,592 issued on Jan. 18, 1938 to L. Hathaway, et al, discloses the use of a pegboard with miniature utility poles adaptable for arrangesment to simulate various structural properties of pole-line construction. However, none of the above prior art is directed to the art of photography and utilizes models adapted to be arranged on a surface with a predetermined pattern of holes corresponding to the distance measured from a common center point and, in addition, are adapted to be inserted into selected ones of the holes to varying depths which interrelated to the distance of the holes from the common center point. This method of teaching the relationship of equipment in photography provides a three-variable coordinate system for easy recording of the position of equipment.

SUMMARY OF THE INVENTION

The invention is directed to a teaching or training device and method with respect to photography, in particular portrait photography. The basic structure includes a box-shaped base. The top surface of the base is a horizontal board which contains a plurality of apertures or holes. In the preferred embodiment, these holes are arranged in a predetermined pattern of concentric circles. Therefore, the location of each hole can be identified by two coordinates. The first coordinate represents the distance the hole is from the common center point or hole. This coordinate identifies in which one of the plurality of concentric circles the particular hole is located. The second coordinate represents the position of the hole in a particular concentric circle. The position of any hole in any concentric circle is determined by its angular position on the planar coordinate surface of the base. The location of the various holes correspond per scale to the floor of the studio. However, other patterns of holes which enable the user to identify the location of any individual hole by a one or multiple point coordinate reference system could also be used.

The models of the equipment used in photography and an illustrative subject model all comprise a head portion which identifies the model and a support portion or dowel attached to the head portion. The length of the dowels are graduated and correspond on the same scale, or a predetermined ratio scale, to that used for the distance of the concentric circles from the center hole. Therefore, each model can be inserted into a hole to a variable depth to obtain a predetermined and desired height measured from the top surface of the base which simulates the height of the actual equipment or subject. The height of any inserted model measured by the graduation on its support piece represents a third coordinate.

Therefore, to define the location of any model, a three-coordinate system is used. The first coordinate identifies the distance the hole is from the common hole. In other words in which one of the concentric circles the hole is located and naturally zero (0) identifies the common center hole. The second coordinate identifies the angular position in degrees of the hole, the position of the hole in the particular concentric circle. The third coordinate identifies the height of the model and depends upon the depth of insertion of the model's support into any hole in any concentric circle.

During the assembly of a particular layout, the position and height of each piece of equipment and the subject can be conveniently and accurately recorded on a card by reference to the location of the hole and height of the dowel. This reference can be filed away for future use and there is no necessity of repeated demonstration in order to memorize the structural placement of equipment required to obtain a desired photographic result.

It is an object of this invention to provide a simple and inexpensive device and method for teaching the art of portrait or studio photography.

It is a further object of this invention to provide models which can be varied in both the horizontal direction and vertical direction.

An additional object of this invention is to provide a simplified system for recording and maintaining the layout of equipment for future reference.

Further and additional objects will appear from the following detailed description of a specific embodiment read in conjunction with the accompanying drawings, wherein:

FIG. 1 is a top view of the invention showing the board surface and illustrating the predetermined pattern of holes.

FIG. 2a–c illustrates some of the various models which can be employed in the invention.

FIG. 3 is a view of the invention illustrating the models inserted at various horizontal positions and to various vertical depths in the board surface.

FIG. 4 illustrates the chart to record the positions of the layout of FIG. 3.

DETAILED DESCRIPTION

Figure 1:
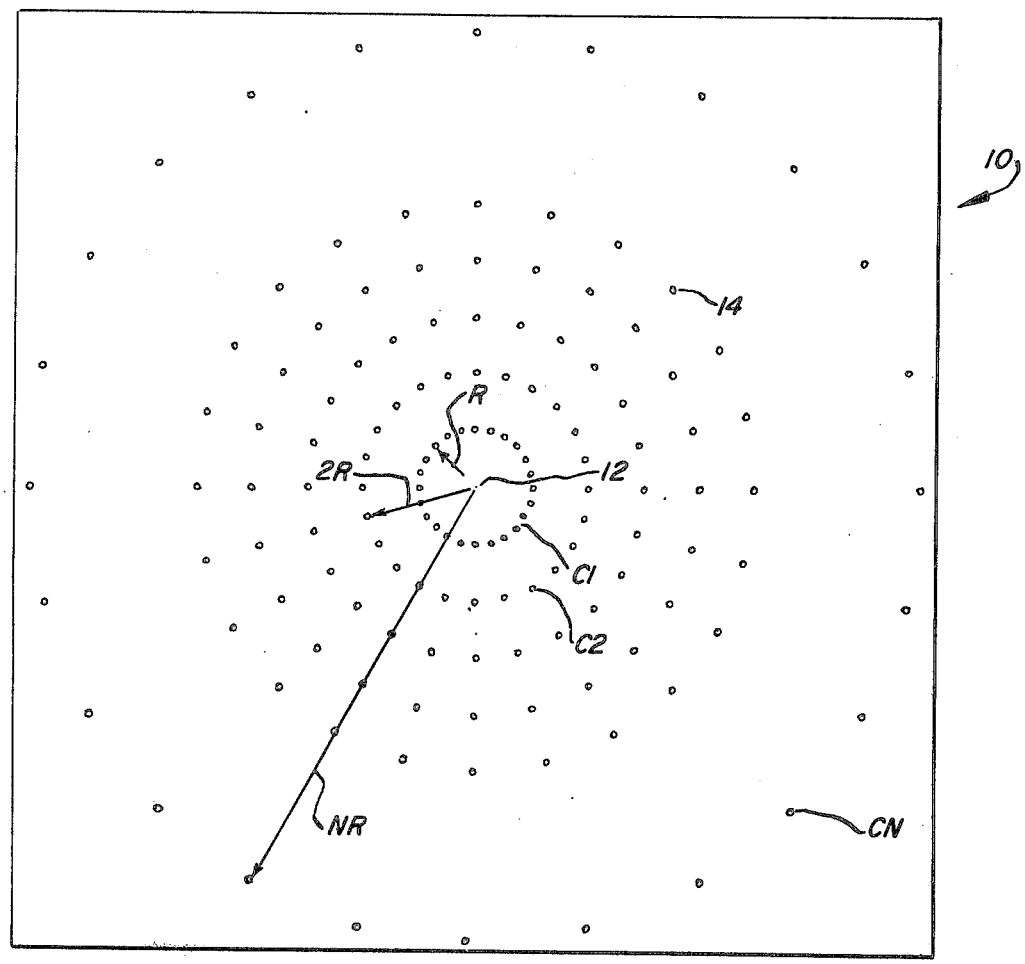

FIG. 1 illustrates a front view of the board 10. At approximately the middle of the board 10, there is formed an aperture or hole 12 which will normally serve as the receptacle for the subject model described further hereinafter and as a reference point for all horizontal measurements. In the preferred embodiment a plurality of holes are formed into a circular pattern C1 at a predetermined radial distance R from center point 12. In this embodiment, there are 24 holes, illustrated by dots, spaced 15° apart which form circular pattern C1 and the radial distance of the circular pattern C1 of holes from the center point 12 is 1 inch which may, for example, represent 1 foot in a photographic studio floor plan. However, the scale or ratio can be altered to fit any desired proportions and while the 1 inch and 24 hole spaced 15° apart is the preferred embodiment any other convenient radial distance, number of holes and degrees of separation can be used.

A second circular pattern C2 of holes is formed with a radius 2R, twice the radius of circular pattern C1. The circular pattern C2 has the same number of holes spaced the same number of degrees apart as circular pattern C1. This arrangement of a concentric circular pattern of holes is repeated any desired number of times until a final circular pattern CN is formed at a radius NR from the center point 12. Each concentric circle can be numbered or color coded for easy recognition and general reference points in degrees (such as 0°, 90°, 180°, etc.) can be indicated on the surface of the board 10.

In the preferred embodiment, there are nine concentric circles of holes N = 9. Therefore to locate an individual hole two coordinates are necessary. First, the radial distance from the center point which identifies the particular concentric circle is necessary. Second, the angular degree or position within the concentric circle is necessary. The hole 14 is located by the coordinates R = 5 (concentric circle C5) and angular degree equal to 45°.

However, it is contemplated that instead of the linear relationship between concentric circular patterns a logarithmic or other mathematical relationship could exist and the number and degree placement of the holes in each separate circular pattern could differ from the other patterns. The final locating coordinate is the height of the model's support above the horizontal board 10 and is determined by the depth of insertion of the model's support through an aperture. This coordinate is fully discussed with respect to FIG. 3.

Figure 2A:
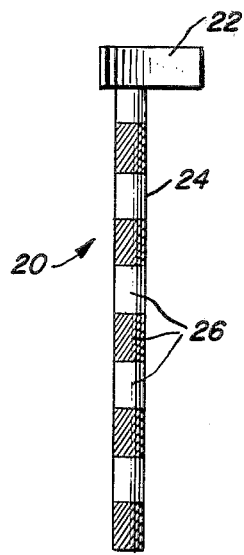
Figure 2B:
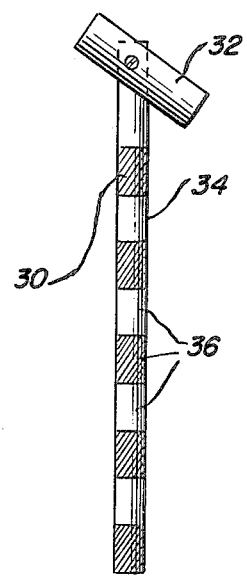
Figure 2C:
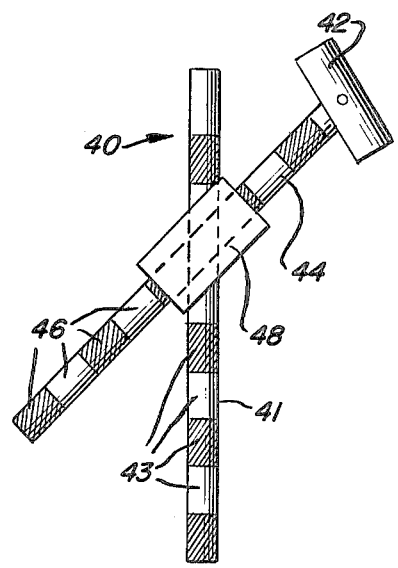

FIGS. 2a–c illustrate some of the equipment models adapted for insertion within any of the holes in any circular pattern. It should be understood that this is only a representative sample of the equipment models and that all the photographic equipment used in a studio would be represented by a model.

FIG. 2a represents the camera model generally indicated by the numeral 20. The camera model is one of the several types of equipment that are usable with the learning system. The camera model 20 comprises a head portion 22 which is formed in the general symbolic shape of a camera to aid in distinguishing this particular equipment model from others. Attached to the head 22, is the support piece or dowel 24 which is adapted to be inserted in any of the apertures which are formed in the surface of the board 10. As can be seen in the FIG. 2a, the support portion of camera model 20 is graduated in uniform increments 26. These increments can be numbered or color coded for easy recognition. Preferably, the uniform increments 26 correspond to and are of equal length as the radius R of the predetermined circular patterns illustrated best in FIG. 1. Thus, if the radius R of the circular pattern C1 is one inch and represents one foot on the studio floor, then each graduation of the dowel would be one inch and represents one foot of equipment height. The uniform increments or graduations 26 on the support portion 24 enable the camera model 20 to be inserted into the board surface 10 to obtain a predetermined and an indicatable height.

In FIG. 2b, there is illustrated light model 30. Light model 30 is comprised of a head section 32 which is formed to simulate in appearance a studio light source and a dowel or support portion 34. Here, as in the camera model 20 the support portion 34 is graduated with uniform increments 36 which preferably correspond to and are equal in length with the radius R of the predetermined circular patterns illustrated in FIG. 1. At this point, it should be noted that these pieces of photographic equipment are only exemplary and all equipment use in the studio would be similarly represented by similar models.

Another model (not illustrated) but similar in construction should be described, the subject model. The subject model comprises a head and body portion to simulate the subject in general and a support portion with uniform graduations identical to those described with respect to other models. The head and body portion of each subject model is numerically marked to indicate the distance from the top of the support portion to the eyes of the subject. The numerically indicated distance marked on the head and body portion of the model is scaled to correspond to a particular number of uniform graduations on the support portion. The total height of the subject model will be the number of uniform graduations on the support portion above the surface of the board plus the numerically marked distance from the top of the support piece to the eyes of the model. The subject model is usually but not limited to insertion in the center hole or reference point 12. In addition, another model, the background screen (not illustrated), comprises a large substantially rectangular screen and a support dowel. The background screen model is positioned in a hole usually directly behind the subject model.

FIG. 2c illustrates the boom light generally indicated at 40. The boom light comprises a head portion 42 which is formed to simulate a light source, the head 42 is connected to an angular support or pole portion 44. The angular support portion 44 has a plurality of uniform graduations 46 which again correspond to and are equal in length with the radius R of predetermined circular patterns illustrated in FIG. 1. However, the angular support portion 44 does not fit into the apertures provided in the board surface 10 as described for the previous equipment but rather fits into a channel in joint 48 preferably at an angle of approximately 450 from the horizontal. The channel in joint 48 can be at any angular degree measured from the horizontal. In this respect, several interchangeable joints each with a channel at a different angle are provided for use in the light model 40. In the alternative a single joint with several channels defined therein (not illustrated) can be used. Also attached and fitted through vertically adjustable joint 48 is a second vertical support portion 41. The vertical support 41 portion also contains uniform graduations 43 and is adapted to fit into any of the plurality of apertures formed in the board surface 10. Therefore, with the boom light model 40, the vertical support portion 41 fits into any aperture in the board surface 10 and is adjustable in a vertical direction therein in accordance with the graduations or uniform incrementation 43 appearing on the vertical support 41. These uniform graduations correspond to and are of uniform length with the radius R1 of the predetermined circular pattern. Thus, if the radius R of the circular pattern C1 is 1 inch and represents 1 foot on the studio floor then each graduation of the vertical support would be 1 inch and represents 1 foot of equipment height. The angular support portion 44 fits into the joint 48 and is movable in its angular position therein also with uniform graduations 46 appearing thereon to determine its particular position.

To properly describe the position of the boom light 40, only the location of the head 42 is considered. Thus, the location of the hole directly beneath the head 42 is identified by the two horizontal coordinates of radius, the distance from the center pont 12 and angular position. The height of the head is then determined by its absolute value height measured with respect to the graduations on the vertical support 41. In addition, the angle that the angular support portion 44 is inserted into the joint 48 is identified.

As an alternative, the boom light model can be located by a slightly modified system. In the modified system, two sets of coordinates are necessary. The first set of three coordinates identifies the position of vertical support 41 with respect to the hole in the board surface 10 into which the support is inserted by the distance from the center point 12, the angular position of the hole and the height of the vertically adjustable joint 48 above the surface. The second set of coordinates identifies the position of the angular support 44 by the location and by the height measured by the graduations of that segment of support 44, between the head portion 42 and the joint 48 of the hole directly beneath the head 42, the distance from the center point 12 and angular position in degrees. In addition, the angle that the angular support portion 44 is inserted into the joint 48 is identified. Thus, the vertical support 41 may be located by the coordinates of radius (R) equal to three, angle equal to 45° and height of joint equal to four and the angular support 44 identified by the coordinates of radius (R) equal to two, angle equal to 30° and height equal to three and angle of insertion into joint 48 equal to 45°.

FIG. 3 illustrates an exemplary arrangement of a photographic studio layout. The positioning of the individual elements in FIG. 3 will correspond to the recording of those elements on the card 70 as illustrated in FIG. 4. A subject model 60 is positioned in the center aperture 12 of the board 10. Since all measurements of distance are taken with the center aperture or subject aperture 12 as the starting point, the distance of the subject model would be zero and the height of the subject model is six, determined by adding the segment of the support portion of the subject model which remains above the board surface which is four and the distance from the top of the support portion to the eyes of the subject model which is marked on the model and which is two. This information is recorded on the card 70 in FIG. 4. Additional space is provided on the card 70 under the heading comments to record information about the subject such as head turned toward the left. A main light 61 is next inserted in a predetermined aperture of the board surface 10. The main light 61 is inserted with a radius R equal to 3 and an angular degree equal to 240° and a height equal to seven. Again this information is recorded on the card 70 beginning with the radial distance equal to 3, the angular position equal to 240° and the height equal to 7. The next piece of equipment which is inserted into the board surface 10 is indicated as a fill light 62. The fill light 62 is the second light in the photographic layout and it is inserted into the aperture in the board surface with the following location, radius equal to 5 and angular degree position equal to 330° and the height equal to five. This information is again recorded on the card 70 for future use.

The third light inserted in the sequence is the boom light 63 which is inserted at the following location, radius of the hole directly beneath the head (R) equals 2, angle of the hole directly beneath the head equal to 15°, and absolute value height with respect to the vertical support equal to 7 and angle of insertion of vertical support 44 into joint 48 equal to 45°. This information is recorded on card 70 in FIG. 4 and the angle of insertion is recorded under the heading comments. Under the modified system to locate the boom light, the following information must be provided, the vertical support radius equal to 3 and angular position equal to 30° at a vertical height of the joint of 5 and the angular support radius 2, angular position 15° and height of two and angle of insertion equal to 45°.

The fourth light to be inserted in the sequence is the background light 64. The background light is inserted at the location described by radius 2 and angular position of 90° and a height of two. This information is recorded again on the card 70. The background screen is located at radius equal to four, angular position equal to 90° and a height of four. The measurement that is important for the background screen is the radius (R) since the screen is usually so large that the height is not important and it usually extends parallel to and behind the subject model so the angular position is usually, but not limited to, 90°. The last information recorded on the card is the position of the camera model 65 which is located by the following coordinates, radius equal to four, angular position equal to 270° and a height equal to five. This final item of information is recorded for future use on card 70.

As seen in FIG. 4, there is an additional space provided at card 70 for remarks or other comments made by the photographer. Also there is space provided at the top of the card to record additional data. While FIG. 4 illustrates the preferred embodiment of the recording card 70, other styles with less or additional data could be used as long as the location of each model can be recorded.

It is apparent from the above description, the indication of height of a particular model is the height that the model is above the planar surface of the board 10. In addition, any well-known procedure for indicating the location of a point on a coordinate system can be utilized to locate a particular aperture on the planar surface 10. As an alternative embodiment, the angular position of a particular aperture could equally well be described by the use of a clock face numeral system. In this type of a system, 12:00 o'clock would equal 90°, 9:00 o'clock would equal 180°, 6:00 o'clock would be 270° while 3:00 o'clock would be 0° and all the intermediate positions would be similarly indicated.

At a later date by using the card 70 as illustrated in FIG. 4, the photographer or a student can duplicate the layout illustrated in FIG. 3 by repositioning the equipment models at these various locations recorded therein. When the various equipment models and the subject model are placed in their desired positions, the appearance of an actual photographic studio is simulated for the student. In this manner, the student can see the relationship on a scale between the pieces of photographic equipment and also between the subject and the various pieces of photographic equipment. The photographer can then illustrate that by changing the position or the height of specific pieces of equipment, a different photographic effect or a different photographic result could be obtained.

The movement of the actual pieces of photographic equipment is eliminated and the potential danger of accident and destruction of the equipment is removed. In addition to this the time necessary to set up the actual photographic equipment is much longer than the time required to assemble the equipment and subject models thereby saving not only the time of the instructor or photographer, but also that of the student. In addition to the above features, the use of this system to teach an individual student enables the student to record position both horizontally and vertically of the equipment used. The student can record these locations by easy reference to the radial distance, angular distance and height of each particular type or piece of equipment.

It is to be understood that the present disclosure can be modified or varied by applying current knowledge without departing from the spirit and scope of the novel concepts of the invention.

I claim:

1. Apparatus for teaching portrait photography by illustrating the height, angle and distance relationship between the equipment used in portrait photography and the subject to be photographed comprising:
   a horizontal surface for representing the floor of a photography studio;
   said surface having a plurality of apertures forming a predetermined pattern;
   said pattern having a center reference aperture and the remaining apertures forming concentric circles with said center reference aperture being the common center point for each of said concentric circles;
   each of said concentric circles having a predetermined radius representing the distance
   from said center aperture;
   a subject model means for inserting into said center reference aperture;
   said subject model means comprising:
     a subject head means for representing the subject to be photographed and,
     a subject support means extending from said subject head means and adapted for insertion into said center aperture;
   a plurality of equipment model means for inserting into said remaining apertures forming said concentric circles;
   said equipment model means comprising:
     a head means for representing the equipment, and an equipment support means extending from said head means and adapted for insertion into one of said remaining apertures forming said concentric circles;
   said subject support means and said equipment support means having predetermined marked graduations related to the radius of said concentric circles so that said subject model means is insertable into said center reference aperture to represent the height of the subject to be photographed and said equipment model means are insertable into said remaining apertures to represent the distance and angle from the subject to be photographed and the height of the equipment; and,
   a card for recording the distance and angle from said center reference aperture and the height above said horizontal surface of said equipment models when inserted into said plurality of apertures and the height above said horizontal surface of said subject model when inserted into said center reference aperture.

* * * * *